United States Patent

Huang

[11] Patent Number: 6,056,553
[45] Date of Patent: May 2, 2000

[54] APPARATUS FOR MATH TEACHING AND SELF-LEARNING

[76] Inventor: Pingsheng Huang, 20 Alpine Rd., Towaco, N.J. 07082

[21] Appl. No.: 09/321,923

[22] Filed: May 28, 1999

[51] Int. Cl.[7] .............................. G09B 19/02; G09B 23/02
[52] U.S. Cl. .......................... 434/188; 434/191; 434/207; 273/292
[58] Field of Search ..................................... 434/188, 191

[56] References Cited

U.S. PATENT DOCUMENTS

| | | | |
|---|---|---|---|
| 705,579 | 7/1902 | Gibson | 434/191 |
| 894,043 | 7/1908 | Oldroyd | 434/191 |
| 1,115,441 | 10/1914 | Lake | 434/191 |
| 1,279,504 | 9/1918 | Blau | 434/191 |
| 1,323,986 | 12/1919 | Joyce | 434/208 |
| 1,696,987 | 1/1929 | Troidl | 434/191 |
| 1,696,988 | 1/1929 | Troidl | 434/208 |
| 1,699,629 | 1/1929 | Phifer | 434/191 |
| 4,281,835 | 8/1981 | Seiden | 434/191 |

*Primary Examiner*—Robert A. Hafer
*Assistant Examiner*—Bena B. Miller

[57] ABSTRACT

A math playing and training system is disclosed. The system comprises two sets of playing pieces, each having a pair of numbers on both sides. The first set has ten pairs of numbers with each pair having a number on the back one number less than that on the front. Besides one pair of symbols of "+" and "−", the second set has 9 pairs of numbers with each having two numbers equal to a sum of 10. For these 9 pairs of tiles there is a symbol of "−" on the front and "+" on the back. A turnover of two tiles at the same time gives players a direct result for addition or subtraction, and a better understanding of regrouping and pair concepts. The system employs the playing pieces and the pair concepts for playing and training in a vertical math operations specially in the fields of addition and subtraction. The system helps math beginners to master basic concepts of addition and subtraction and to reach the stage of mental arithmetic through entertaining playing and systematic training.

2 Claims, 3 Drawing Sheets

( Turn over tiles of " 1 " and " 8 ", and add " 2 " for an answer. )

( Turn over tiles of " 1 " and " 8 ", and add " 2 " for an answer. )

( Turn over tiles of " 1 " and " 8 ", and subtract " 2 " for an answer. )

APPARATUS FOR MATH TEACHING AND SELF-LEARNING

BACKGROUND

1. Field of Invention

This invention relates to a math leaning, training, and playing system, comprising two sets of 20 paired playing pieces.

2. Description of Prior Art

There are various ways for parents and math educators to teach math beginners to tackle problems of addition and subtraction, specially when regrouping is necessary. More often, concrete objects are used to reinforce the math facts at this stage. Traditional ways of counting objects and fingers and the use of flash cards play an important role to get the math facts through.

Math beginners are incapable of any concepts without seeing or toughing concrete objects. Numerous products of numbers and math facts have been introduced into the educational market, but few of them are concerned about children's psychological reality and academic ability of conceptual acceptance at this stage. Psychological and conceptual factors have a lot to do with the development of children's habitual methods in their future academic pursuit.

Regrouping and pair concepts in addition and subtraction have proved to be critical in developing children's metal arithmetic and interest in math. Most educators and parents have to get children into this stage by doing more drills and memorizing individual math facts. Pair concepts(10=5+5= 4+6=3+7 . . . ; 10–5=5 . . .)have yet to be fully employed in the process of learning and training. Math games have been created with attempts to raise learning interest. Such educational device include those disclosed by U.S. Pat. No. 1,115,441 to Lake., U.S. Pat. No. 705,579 to Gilson, U.S. Pat. No. 1,699,629 to Phifer, U.S. Pat. No. 4,281,835 to Seiden, U.S. Pat. No. 894,043 to Oldroyd, U.S. Pat. No. 1,279,504 to Blau, U.S. Pat. No. 1,696,988 to Troidl, U.S. Pat. No. 1,323,986 to Joyce, and U.S. Pat. No. 1,696,987 to Troidl. All the above educational games provide an entertaining environment to raise math learning interest, but fail qualitatively and quantitatively to provide devices that promise stronger understanding and higher productivity after playing. In other words, players with same levels of math knowledge and skills can play together with fun and there is no guarantee that these games can help them move to higher levels. The physical structure and design of these games make it impossible to become educational devices to reinforce acquired skills, and, at the same time, introduce new knowledge and skills. For example, It is physically impossible for Lake's game to teach a $2^{nd}$ grader to subtract 168 from 300.

Therefore, there is a great need for recognizing the children's psychological reality, satisfying their conceptual potential, and paving way for the development of mental arithmetic. There has further been a great need for discovering the mental process in addition and subtraction at the early learning stage, and providing a visual and straightforward system backed by the conceptual-driven materials and psychologically-guided method for the learning and teaching process.

SUMMARY OF INVENTION

The present invention has been in consideration of the above described problems and needs. The disclosed playing system involves highly psychological and conceptual process and can be used for learning, training and entertaining.

According to one aspect of the invention, the disclosed system comprises two sets of 20 paired playing pieces. The playing pieces are usually tiles, each bearing a number on either side. The first set has 10 playing pieces with numbers 0 1 2 3 4 5 6 7 8 9 engraved on the front and 9 0 1 2 3 4 5 6 7 8 on the back. The front part of numbers is used to be subtracted from and the back part to be added to in a vertical math operation. The second set has 10 playing pieces with 9 numbers -1-2- 3- 4-5-6-7-8-9 and a "–" symbol on the front, and +9+8 +7+6+5+4+3+2+1 and a "+" symbol on the back. The front part of the second set is used to subtract and the back part to add.

Therefore an important object of the present invention is to provide an entertaining instrument for math beginners to discover the fun part of the process of regrouping, pair-concept developing, math-fact finding, and mental-arithmetic mastering.

It is another object of the present invention to provide an entertaining instrument for math beginners to employ the concrete materials for discovering the conceptual truth behind math facts.

It is still another object of the present invention to provide an entertaining instrument for math beginners to rely on the conceptual truth for developing mental arithmetic and systematic habit when approaching basic math problems.

It is still another object of the present invention to provide an entertaining and learning environment to save some learning time for memorizing math facts and lots of paper sheets for doing math drills.

It is still another object of the present invention to provide an entertaining solution for kids to enjoy math and life, and most of all, to be able to master math concepts with confidence and to put them into the practice of solving basic math problems.

Other objects, together with the foregoing are attained in the exercise of the invention in the following description and resulting in the embodiment illustrated in the accompanying drawing.

DRAWING FIGURES

DESCRIPTION—FIGS. 1 TO 6

Figure 1:
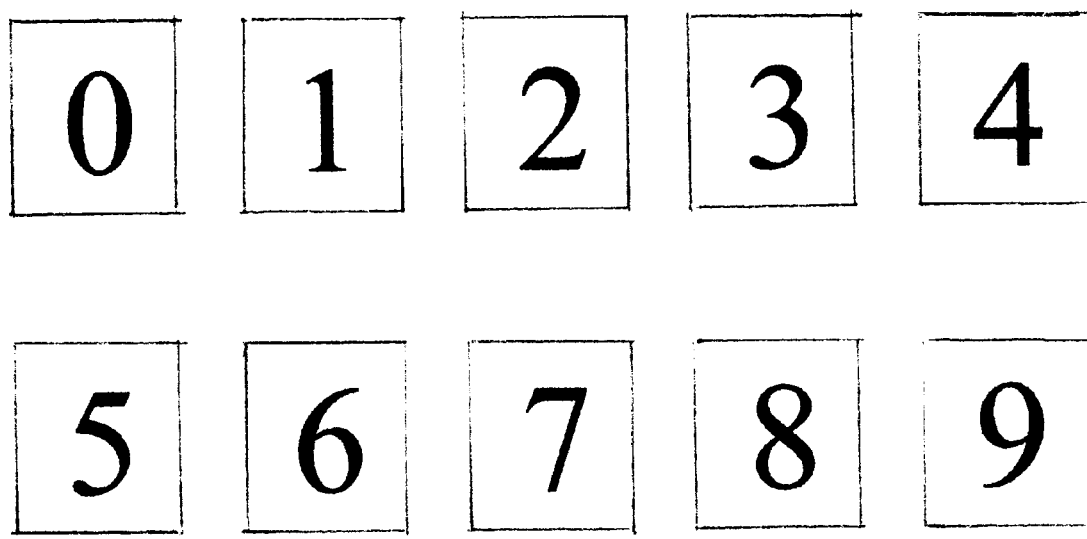
FIG. 1 shows the front part of the first set.
Figure 2:
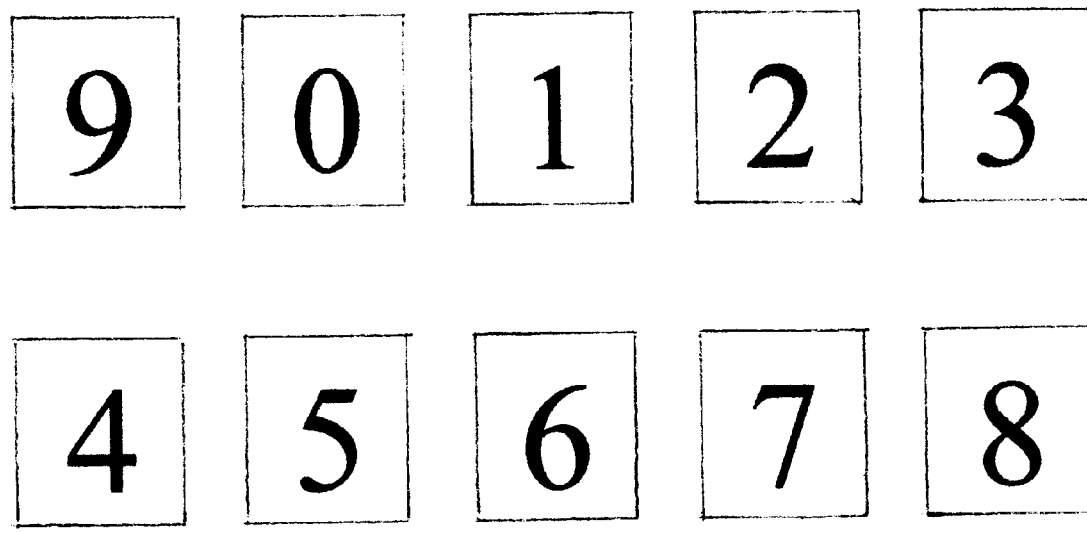
FIG. 2 shows the back part of the first set.

Referring now to the drawings, in which like numerals refer to like parts throughout the several views. FIG. 1 shows 10 front faces of the first set. FIG. 2 shows 10 back faces of the first set. Each piece has a number on both faces. The numbers on the front run from 0 to 9 (0 1 2 3 4 5 6 7 8 9) and the numbers on the back from 9 to 8 (9 0 1 2 3 4 5 6 7 8).

The playing pieces are made out of plastics, wood and any solid materials and the colors of numbers on both faces may be different. When playing addition, playing pieces with smaller numbers as in FIG. 2 are placed face up on top in a vertical math format for a start When playing subtraction, playing pieces with bigger numbers as in FIG. 1 are placed face up on top in a vertical math format for a start.

Figure 3:
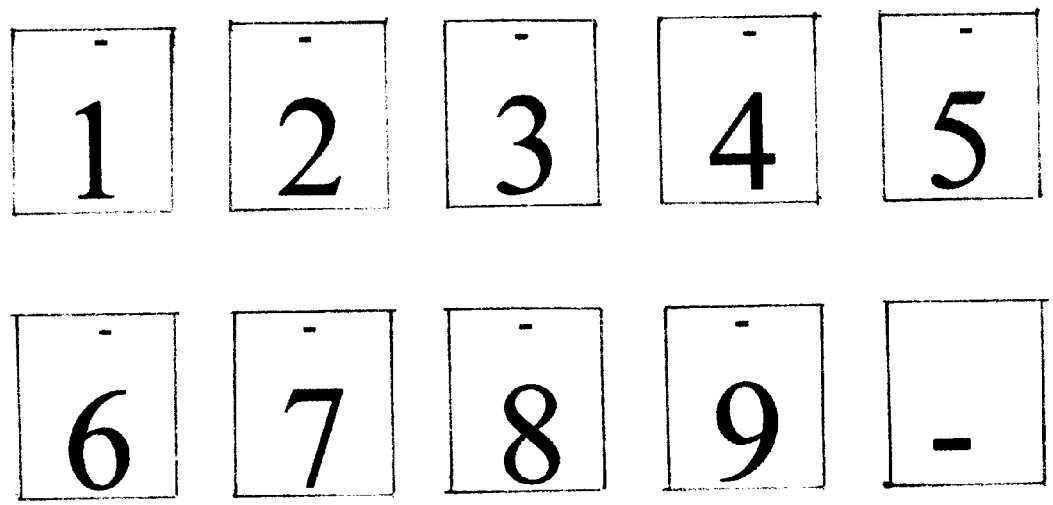
FIG. 3 shows the front part of the second set.
Figure 4:
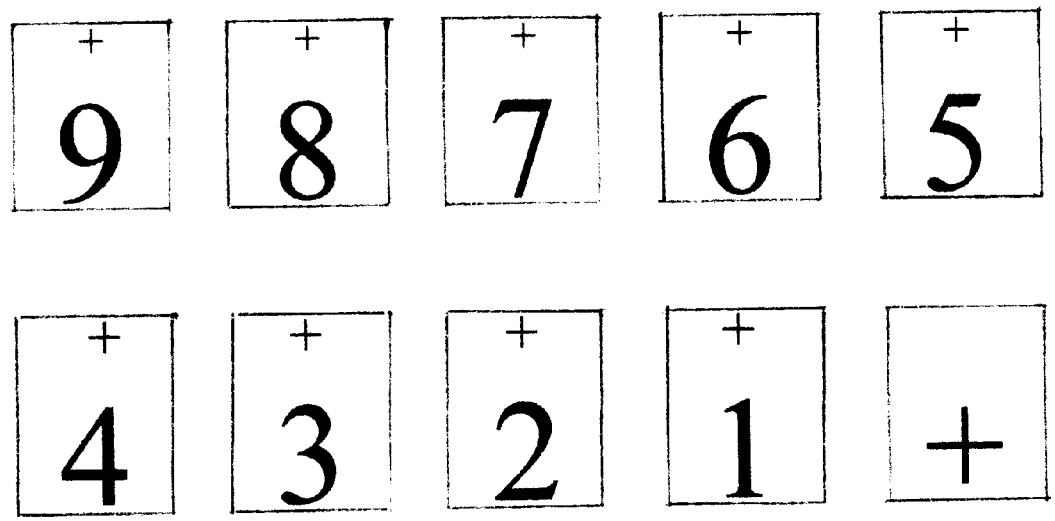
FIG. 4 shows the back part of the second set.

FIG. 3 shows 10 front faces of the second set. There are 9 numbers from 1 to 9 together with a symbol "–" and a symbol "−" on the tenth piece. FIG. 4 shows 10 back faces of the second set. There are 9 numbers from 9 to 1 together with a symbol "+" and a symbol "+" on the tenth piece. The sum of the two numbers from both faces on each tile is 10, e.g. if the number on the front is 2, the number on the back will be 8.

When playing addition, playing numbers with the "+" symbol should be placed face up on bottom in a vertical math format for a start, and in the case for subtraction, pieces with the "−" symbol are placed face up on bottom for a start.

Figure 5:
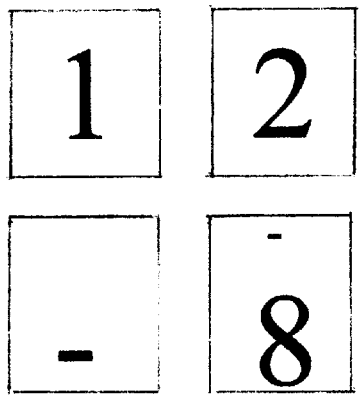
FIG. 5 illustrates an example of application for subtraction.
Figure 5:
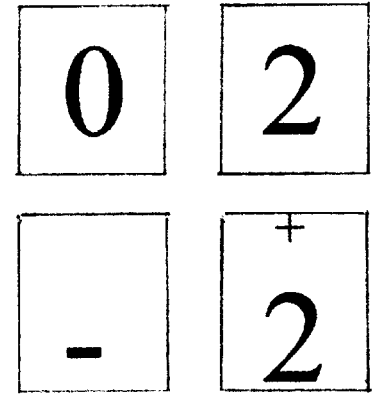
Figure 5:
Figure 6:
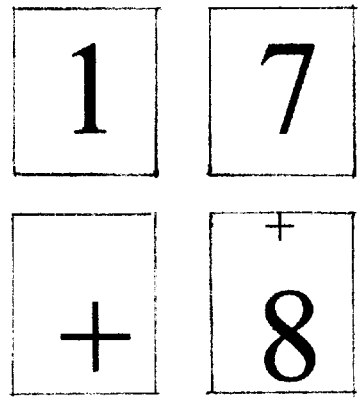
FIG. 6 illustrates an example of application for addition.
Figure 6:
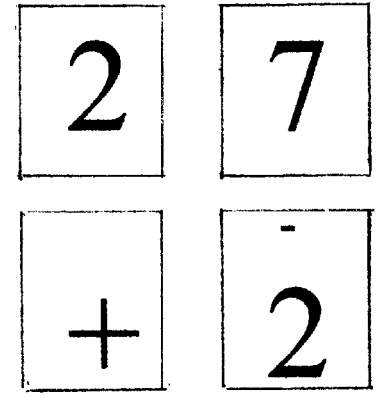
Figure 6:
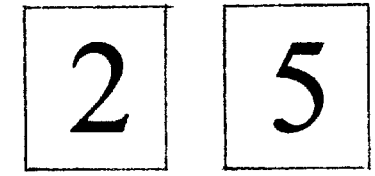

Referring now to FIG. 5 and 6, there are shown two examples of application for subtraction in FIG. 5 and addition in FIG. 6. FIG. 5 shows the operation of turning over two tiles: one in the "tens" position on top to finish an action of regrouping and the other in the "ones" position on bottom to use the pair concept for a quick solution. The system with a concrete and easy-to-operate setting provides a helpful environment for learning math facts and training mental arithmetic.

From the description above, a number of advantages of the present invention of the learning system become evident:

(a) The playing pieces of the first set will provide a natural and solid base for math beginners to form a systematic habit when handling situations of addition and subtraction where regrouping is needed.

(b) The playing pieces of the second set will reinforce the useful pair concepts of addition and subtraction and help using these concepts to solve basic math problems in a natural setting.

(c) The system will provide the training of mental arithmetic with playable materials, concrete steps, and designated results.

(d) The system will provide an entertaining environment for math beginners to set their own paces for mastering the dry math facts in a fun way.

Operation—FIGS. 1, 2, 3, 4, 5, 6

The system can be used as a tool for training mental arithmetic and developing systematic habit. Good living habits and sound systematic methods will result in good physical health and better academic performance. Better understanding and speedy methods of handling basic addition and subtraction will surely be a boost to a better academic future. As shown in FIG. 1 and 2, the upward and downward movement in addition and subtraction are physically emphasized. When dealing with addition and subtraction, math beginners tend to forget adding 10 or subtracting 10 after the regrouping. The system eliminates this type of possible mistakes.

As shown in FIG. 3 and 4, the pair concepts have been used fully. The playing pieces can be used for training short-cut methods by matching the paired numbers. There are 5 pairs of numbers to be added up to 10: 5 an 5; 4 and 6; 3 and 7; 2 and 8; 1 and 9. These pairs can be served as short-cut bridges for training mental arithmetic in addition and subtraction.

As shown in FIG. 5, the system provides a visual and clear direction for a regrouping operation of the subtraction. Without any other help available, math beginners can simply use their old tricks by counting fingers for a solution. The traditional way is a two-step approach: 1) regrouping and 2) subtracting. Conventional wisdom has shown that a two-way approach needs a longer period of time for training in order to have a well-organized result. The present invention provides a systematic training process for an instant result.

As shown in FIG. 5, in the "ones" position on top, there are 6 short for the subtraction. Obviously, a "ten" regrouping is necessary. When 10 being directly subtracted by 8, there are 2 left. Therefore, 2 are added back for the total remainder. The operation is applicable both psychologically and technically. The result is obvious and instant.

As shown in FIG. 6, in order to advance to a "ten" group, 8 have to borrow 2 to satisfy the requirement. Therefore, 2 are subtracted from the total remainder.

After some training, the users of the system may not be required to flip over each playing piece to do the addition or subtraction. The playing system finishes its final and ultimate objective.

Conclusion, Ramification, and Scope

Accordingly, the reader will see that the present invention can provide a learning and training environment for math beginners to follow their psychological instincts and systematic steps in their work of addition and subtraction. In addition, the present invention makes it possible to obtain math training and skills with great confidence and fun. Furthermore, the present invention has the additional advantages in that:

it provides concrete materials for learning and training;

it puts dry concepts into an entertaining practice;

it allows an active participation in the learning process;

it builds a strong math base for a better academic future.

Although the present invention has been described in considerable detail with reference to certain embodiment thereof, other versions are possible. For example, the tiles can be replaced by cards and other physical formats. In addition, the tiles in electronic formats are possible for self learning and training purposes. Furthermore, the pair system can be used in different formats. For example, the two-face tiles can be replaced by one-face tile. It is understood to those skilled in the art that the system of the present invention can be altered to meet individual users' need and various educational purposes. Therefore, the spirit and scope of the appended claims should not be limited to the description of the preferred embodiment contained herein.

What is claimed is:

1. An apparatus for math teaching and self learning comprising:

two sets of cards;

each card having a first color on a first side and a second color on the opposite second side;

one set of cards have ten regrouping cards, each card having a number from zero to nine on both said first and second sides, each of the said ten regrouping cards bearing a number on the second side one less than that on the first side;

the second set comprising a set of at least nine cards having numbers from one to nine on each of the first and second sides, the two numbers on each card equal to a sum ten, each of the cards having a symbol "−" on the first side and "+" on the second side, wherein the number on the first side is used at the bottom for starting a vertical subtraction operation and the second side is for addition operation.

2. The apparatus of claim 1 further comprising a separate card with a symbol "−" on a first side and "+" on the opposite second side.

* * * * *